United States Patent
Koshelev et al.

(10) Patent No.: US 11,555,962 B1
(45) Date of Patent: Jan. 17, 2023

(54) WAVEGUIDE ILLUMINATOR WITH OPTICAL INTERFERENCE MITIGATION

(71) Applicant: Facebook Technologies, LLC, Menlo Park, CA (US)

(72) Inventors: Alexander Koshelev, Redmond, WA (US); Giuseppe Calafiore, Redmond, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 0 days.

(21) Appl. No.: 17/556,895

(22) Filed: Dec. 20, 2021

Related U.S. Application Data (60) Provisional application No. 63/222,224, filed on Jul. 15, 2021.

(51) Int. Cl.
*G02B 6/124* (2006.01)
*G02B 27/10* (2006.01)
(Continued)

(52) U.S. Cl.
CPC ............ *G02B 6/124* (2013.01); *G02B 5/30* (2013.01); *G02B 5/3025* (2013.01);
(Continued)

(58) Field of Classification Search
CPC ............ G02B 6/12004; G02B 6/12007; G02B 6/124; G02B 6/125
See application file for complete search history.

(56) References Cited

U.S. PATENT DOCUMENTS

| 5,911,018 A | 6/1999 | Bischel et al. |
| 6,201,913 B1 * | 3/2001 | Yi .................... G02B 6/2804 385/48 |

(Continued)

FOREIGN PATENT DOCUMENTS

| CN | 106405450 A | 2/2017 |
| EP | 3819688 A1 | 5/2021 |

(Continued)

OTHER PUBLICATIONS

Teng S., et al., "Uniform Theory of the Talbot Effect with Partially Coherent Light Illumination," Journal of the Optical Society of America. A, Optics, image science, and vision, Sep. 2003, vol. 20, No. 9, pp. 1747-1754.

(Continued)

*Primary Examiner* — Keith G. Delahoussaye
(74) *Attorney, Agent, or Firm* — Pequignot + Myers; Matthew A. Pequignot (57) ABSTRACT

A waveguide illuminator includes an input waveguide, a waveguide splitter coupled to the input waveguide, and a waveguide array coupled to the waveguide splitter. The waveguide array includes an array of out-couplers out-coupling portions of the split light beam to form an array of out-coupled beam portions for illuminating a display panel. To reduce optical interference, the waveguide illuminator may have two interlaced waveguide arrays energized by two different light sources. Output polarizations of neighboring light pixels of a display illuminated with such waveguide illuminator may be orthogonal to each other. The frames to be displayed may be broken down into sequentially displayed sub-frames with interleaved pixels.

14 Claims, 7 Drawing Sheets

(51) Int. Cl.

| | |
|---|---|
| *G02B 5/30* | (2006.01) |
| *G02B 27/09* | (2006.01) |
| *G02B 6/125* | (2006.01) |
| *G02B 6/12* | (2006.01) |
| *F21V 8/00* | (2006.01) |
| *G02B 5/18* | (2006.01) |
| *G02B 27/01* | (2006.01) |

(52) U.S. Cl.
CPC ....... *G02B 5/3041* (2013.01); *G02B 6/12004* (2013.01); *G02B 6/125* (2013.01); *G02B 6/12007* (2013.01); *G02B 27/0944* (2013.01); *G02B 27/0994* (2013.01); *G02B 27/106* (2013.01); *G02B 5/18* (2013.01); *G02B 6/0036* (2013.01); *G02B 27/017* (2013.01)

(56) References Cited

U.S. PATENT DOCUMENTS

| | | | |
|---|---|---|---|
| 7,468,838 B2 * | 12/2008 | Cha | G02B 30/25 348/58 |
| 10,613,410 B2 * | 4/2020 | Hosseini | G02F 1/292 |
| 10,684,404 B2 | 6/2020 | Fattal | |
| 2005/0089277 A1 * | 4/2005 | Ishida | G09G 3/002 385/16 |
| 2011/0274438 A1 | 11/2011 | Fiorentino et al. | |
| 2013/0155477 A1 | 6/2013 | Yankov et al. | |
| 2014/0314374 A1 | 10/2014 | Fattal et al. | |
| 2017/0090096 A1 | 3/2017 | Fattal | |
| 2017/0139110 A1 | 5/2017 | Woodgate et al. | |
| 2017/0299793 A1 | 10/2017 | Fattal | |
| 2018/0107091 A1 | 4/2018 | Hosseini et al. | |
| 2018/0113419 A1 | 4/2018 | Stafford | |
| 2018/0152680 A1 | 5/2018 | Zimmerman et al. | |
| 2019/0155105 A1 | 5/2019 | Meta et al. | |
| 2020/0271850 A1 | 8/2020 | Vora et al. | |
| 2022/0236486 A1 * | 7/2022 | Munoz | G02B 6/2804 |

FOREIGN PATENT DOCUMENTS

| | | |
|---|---|---|
| WO | 2020041067 A1 | 2/2020 |
| WO | 2022120250 A1 | 6/2022 |
| WO | 2022120253 A1 | 6/2022 |

OTHER PUBLICATIONS

International Search Report and Written Opinion for International Application No. PCT/US2022/036056, dated Sep. 8, 2022, 13 pages.

International Search report and Written Opinion for International Application No. PCT/US2022/036987, dated Oct. 19, 2022, 11 pages.

International Search Report and Written Opinion for International Application No. PCT/US2022/037357 dated Sep. 23, 2022, 11 pages.

International Search Report and Written Opinion for International Application No. PCT/US2022/036058, dated Nov. 9, 2022, 12 pages.

International Search report and Written Opinion for International Application No. PCT/US2022/037012, dated Nov. 15, 2022, 11 pages.

* cited by examiner

WAVEGUIDE ILLUMINATOR WITH OPTICAL INTERFERENCE MITIGATION

REFERENCE TO RELATED APPLICATION

This application claims priority from U.S. Provisional Patent Application No. 63/222,224 entitled "Single Mode Backlight Illuminator", filed on Jul. 15, 2021 and incorporated herein by reference in its entirety.

TECHNICAL FIELD

The present disclosure relates to illuminators, visual display devices, and related components and modules.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems such s near-eye displays (NEDs) are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed with the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. Consequently, head-mounted display devices can benefit from a compact and efficient configuration, including efficient light sources and illuminators providing illumination of a display panel, high-throughput ocular lenses and other optical elements in the image forming train.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
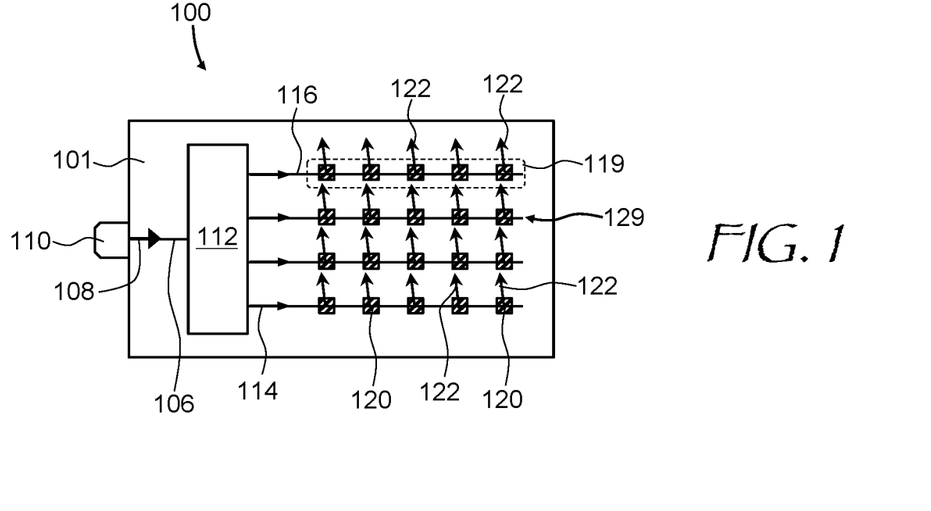
FIG. 1 is a schematic plan view of a waveguide illuminator of the present disclosure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 7, and 8, similar reference numerals refer to similar elements. Also in FIGS. 3A, 3B to FIGS. 6A, 6B, similar reference numerals refer to similar elements.

In a visual display including an array of pixels coupled to an illuminator, the efficiency of light utilization depends on a ratio of a geometrical area occupied by pixels to a total area of the display panel. For miniature displays often used in near-eye and/or head-mounted displays, the ratio can be lower than 50%. The efficient backlight utilization can be further hindered by color filters on the display panel which on average transmit no more than 30% of incoming light. On top of that, there may exist a 50% polarization loss for polarization-based display panels such as liquid crystal (LC) display panels. All these factors considerably reduce the light utilization and overall wall plug efficiency of the display, which is undesirable.

In accordance with this disclosure, light utilization and wall plug efficiency of a backlit display may be improved by providing a waveguide illuminator including an array of out-couplers aligned with pixels of the display panel. In displays where the illuminator emits light of primary colors, e.g. red, green, and blue, the color of the illuminating light may be matched to the color filters, or the color filters may be omitted altogether. For polarization-based displays, the polarization of the emitted light may be matched to a pre-defined input polarization state. Matching the spatial distribution, transmission wavelength, and/or the transmitted polarization characteristics of the pixels of the display panel enables one to considerably improve the useful portion of display light that is not absorbed or reflected by the display panel on its way to the eyes of the viewer, and consequently to considerably improve the display's wall plug efficiency.

Singlemode or few-mode waveguides, e.g. ridge waveguides with up to 12 modes of propagation, in combination with laser illumination allow for efficient control of such light properties as color and directivity. As light propagates in a single spatial mode, the output can be diffraction-limited and highly directional. Single mode propagation also allows one to out-couple light in specific points on the waveguide and incorporate focusing pixels that can focus light into the pixels of a display panel while avoiding scattering in inter-pixel areas. The narrow spectrum of laser illumination enables large color gamut displays. Furthermore, single mode waveguides may preserve polarization, which results in highly polarized output from the backlight unit without the need of a polarizer.

Due to coherent nature of propagating light, illuminators based on single-mode waveguides may be prone to speckle pattern formation caused by optical interference between different sub-beams of out-coupled coherent light. In accordance with this disclosure, effects of speckle formation may be lessened by making sure that neighboring out-coupled sub-beams of illuminating light do not interfere with one another on a retina of a user's eye. Thus may be achieved e.g. by destroying coherence between the neighboring sub-beams, by making sure their polarization is mutually orthogonal, and/or by making sure only one of two neighboring sub-beams reaches user's eye at any given time.

In accordance with the present disclosure, there is provided a waveguide illuminator comprising first and second waveguide splitters configured to receive first and second light beams, respectively, for splitting the first and second light beams into first and second pluralities of sub-beams, respectively. First and second waveguide arrays are coupled to the first and second waveguide splitters, respectively, and configured to propagate the sub-beams of the first and second pluralities of sub-beams, respectively. Waveguides of the first and second waveguide arrays are interleaved and run parallel to each other. The waveguide illuminator includes an array of rows of out-couplers. Each row of out-couplers of the array is coupled to a waveguide of the first or second waveguide array along a length of the waveguide for forming a two-dimensional array of interleaved out-coupled sub-beam portions of the first and second pluralities of sub-beams.

In some embodiments, first and second waveguide arrays are coupled to the first and second waveguide splitters at opposed ends of the first and second waveguide arrays, such that the sub-beams of the first and second pluralities of sub-beams counter-propagate in the respective waveguide arrays. Out-couplers of neighboring rows of out-couplers may be offset relative to one another in a direction along the waveguides of the first and second waveguide arrays, to form a rhombic array of out-couplers. The waveguide illuminator may further include first and second semiconductor light sources coupled to the first and second waveguide splitters, respectively, for providing the first and second light beams to the first and second waveguide splitters. The first and second semiconductor light sources may be configured to emit light at different wavelengths of a same color channel. The first and second semiconductor light sources may include laser diodes at different emission wavelengths. A controller may be coupled to the first and second semiconductor light sources. The controller may be configured to operate the first and second semiconductor light sources alternately in a time-sequential manner.

In accordance with the present disclosure, there is provided a display device comprising a display panel comprising a two-dimensional pixel array, a waveguide illuminator of this disclosure, and a spatially variant polarizer. The waveguide illuminator is configured to illuminate the display panel. The waveguide illuminator may include a waveguide splitter configured to receive and split a light beam into a plurality of sub-beams; a waveguide array coupled to the waveguide splitter and configured to propagate the sub-beams therein, waveguides of the waveguide array running parallel to each other; and an array of rows of out-couplers, each row of out-couplers of the array being coupled to a waveguide of the waveguide array along a length of the waveguide for forming a two-dimensional array of out-coupled sub-beam portions. The spatially variant polarizer may be disposed downstream of the display panel and configured to propagate out-coupled sub-beam portions of a first polarization state and to block out-coupled neighboring sub-beam portions of a second, orthogonal polarization state.

The spatially variant polarizer may include laterally joined linear polarizer segments of orthogonal orientations of polarization transmission axes. The linear polarizer segments of a same direction of polarization may be arranged in a checkerboard pattern. The spatially variant polarizer may include a linear polarizer and a spatially variant waveplate downstream of the linear polarizer, the spatially variant waveplate comprising laterally joined waveplate segments of different direction of optic axis arranged in a checkerboard pattern. The waveplate segments of a same direction of optic axis may be arranged in a checkerboard pattern.

In accordance with the present disclosure, there is further provided a display device comprising a display panel and a waveguide illuminator of this disclosure. The display panel may include a two-dimensional pixel array, e.g. an array of transmissive light valves, which may be formed in a liquid crystal layer. The waveguide illuminator may include a waveguide splitter configured to receive and split a light beam into a plurality of sub-beams; a waveguide array coupled to the waveguide splitter and configured to propagate the sub-beams therein, waveguides of the waveguide array running parallel to each other; and an array of rows of out-couplers, each row of out-couplers of the array being coupled to a waveguide of the waveguide array along a length of the waveguide for forming a two-dimensional array of out-coupled sub-beam portions corresponding to the two-dimensional pixel array of the display panel.

The display device may further include a controller operably coupled to the display panel and configured to cause the display panel to display a plurality of sub-images in a time-sequential manner, the sub-images adding up to an image to be displayed to a user. Pixels of different sub-images of the plurality of sub-images may be interleaved with one another. For example, pixels of different sub-images of the plurality of sub-images may be disposed in complementary checkerboard patterns. The plurality of sub-images may include first and second sub-images having interleaved pixels, such that each pixel of the first sub-image has at least two neighboring pixels of the second sub-image. Each pixel of the first sub-image may have at least three neighboring pixels of the second sub-image.

Referring now to FIG. 1, a waveguide illuminator 100 includes a substrate 101 supporting an input waveguide 106 for guiding an input light beam 108 provided by a light source 110, such as a laser source. Herein, the term "waveguide" denotes a light guiding structure that bounds the light propagation in two dimensions, like a light wire, and guides the light in a single transversal mode, or in several transversal modes, e.g. up to 12 modes of propagation. A waveguide may be straight, curved, etc. One example of a linear waveguide is a ridge-type waveguide. The waveguide illuminator 100 may be implemented in a photonic integrated circuit (PIC).

A waveguide splitter 112 is coupled to the input waveguide 106. The function of the waveguide splitter 112 is to split the input light beam 108 into a plurality of sub-beams 114. An array of waveguides 116 is coupled to the waveguide splitter 112 for guiding the sub-beams 114 in the waveguides 116. The waveguides 116 run parallel to one another as illustrated. Each waveguide 116 is configured to guide one of the sub-beams 114 from the waveguide splitter 112 to an end 129 of the waveguide 116.

An array of rows 119 of out-couplers 120 is supported by the substrate 101 of the waveguide illuminator 100. Each row 119 of the out-couplers 120 is coupled to one of the waveguides 116 along a length of the waveguide 116, for out-coupling portions 122 of one of the sub-beams 114 propagating in the waveguide 116. The portions 122 out-coupled by all rows 119 of the out-couplers 120 form a two-dimensional array of the sub-beam portions 122 out-coupled from the waveguide array and exiting at an angle, including an acute or straight angle, to the substrate 101. X- and Y-pitch of the two-dimensional array of the sub-beam portions 122 may be selected to match X- and Y-pitch of a display panel illuminated by the waveguide illuminator 100.

Figure 2:
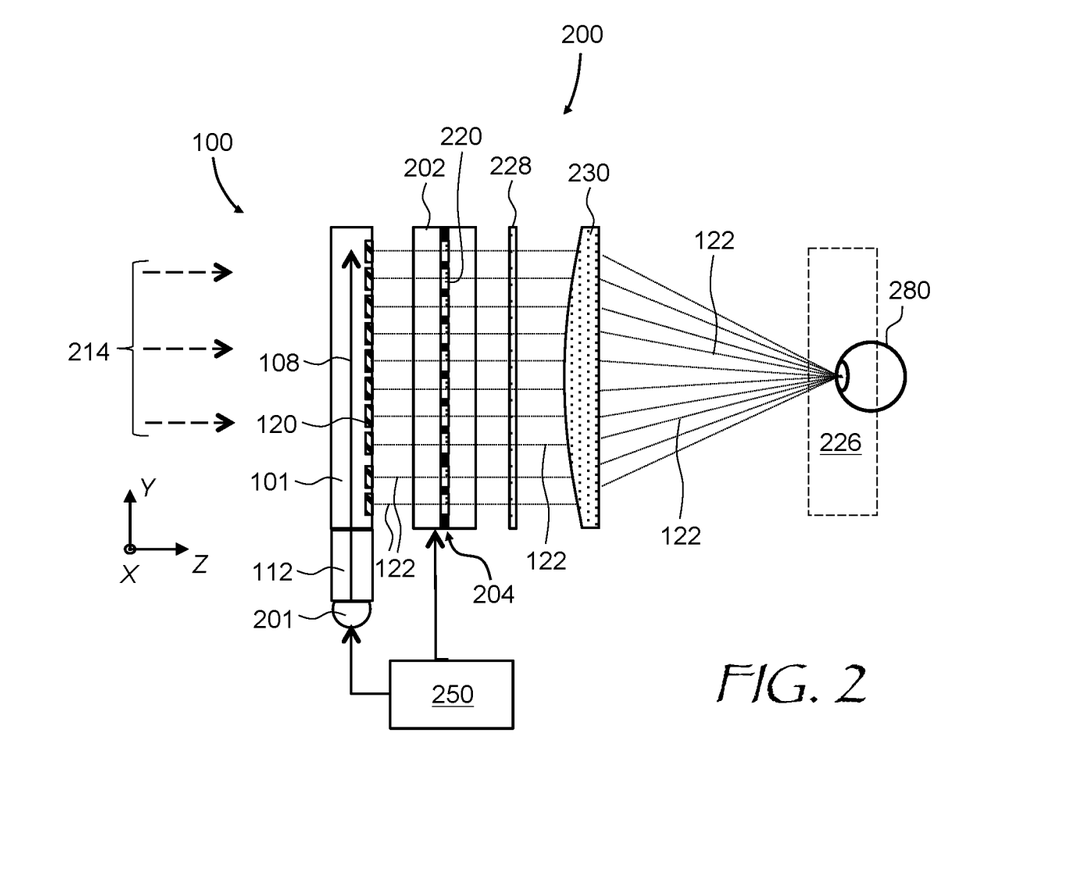
FIG. 2 is a schematic view of a display device using the waveguide illuminator of FIG. 1.

Referring to FIG. 2 with further reference to FIG. 1, a display device 200 includes the waveguide illuminator 100 of FIG. 1, or any other waveguide illuminator disclosed herein. The waveguide illuminator 100 is coupled to a display panel 202 (FIG. 2). A light source 201, e.g. a semiconductor light source at a wavelength of a color channel, may be optically coupled to the illuminator 100 for providing the light beam 108 to the illuminator 100. The display panel 202 includes a two-dimensional array of display pixels 220, e.g. an array of transmissive light valves, disposed and configured to receive the array of the out-coupled sub-beam portions 122 from the illuminator 100. To ensure that the sub-beam portions 122 are used efficiently, locations and pitch of the display pixels 220 may be matched to locations and pitch of the array of out-couplers 120, in both X- and Y-directions. A pitch of the display pixels 220 may be substantially equal to a pitch of the array of the out-couplers 120.

The display device 200 may further include a controller 250 operably coupled to the light source 201 and the display panel 202 for energizing the light source 201 while providing control signals for setting individual optical transmission values, or other properties such as polarization conversion properties, of the display pixels 220. In some embodiments, the display panel 202 may include a liquid crystal layer 204, with the display pixels 220 configured to individually and controllably convert or tune a polarization state of the individual sub-beam portions 122, e.g. rotate a linear polarization state. In such embodiments, the light source 201 may be a polarized light source emitting linearly polarized light. A linear polarizer 228 may be provided to convert the polarization distribution of the sub-beam portions 122 imparted by the display pixels 220 into an optical power density distribution, or brightness distribution, representing an image to be displayed. A polarizer that converts the polarization distribution into an optical power density or brightness distribution is commonly termed analyzer. The liquid crystal pixels in combination with analyzer form the array of light valve pixels having controllable optical transmission.

The image formed downstream of the linear polarizer 228 is in linear domain, where pixel coordinates of the image being displayed correspond to XY coordinates of the display pixels 220. An ocular lens 230 may be used to convert the image in linear domain into an image in angular domain at an eyebox 226 for direct observation by an eye 280. Herein, the term "image in angular domain" refers to an image where pixel coordinates of the image being displayed correspond to ray angles of the sub-beam portions 122. In embodiments with tunable polarization rotators, the light source 201 may emit polarized light, and the waveguide illuminator 100 may preserve that state of polarization. In some embodiments, the waveguide illuminator 100 may be made transparent to external light 214.

One potential issue associated with using coherent light sources to illuminate a display panel, e.g. the light source 201 illuminating the display panel 202, is speckle pattern formation. Speckles may be observed by the eye 280 due to the coherent nature of the light source 201.

Figure 3:
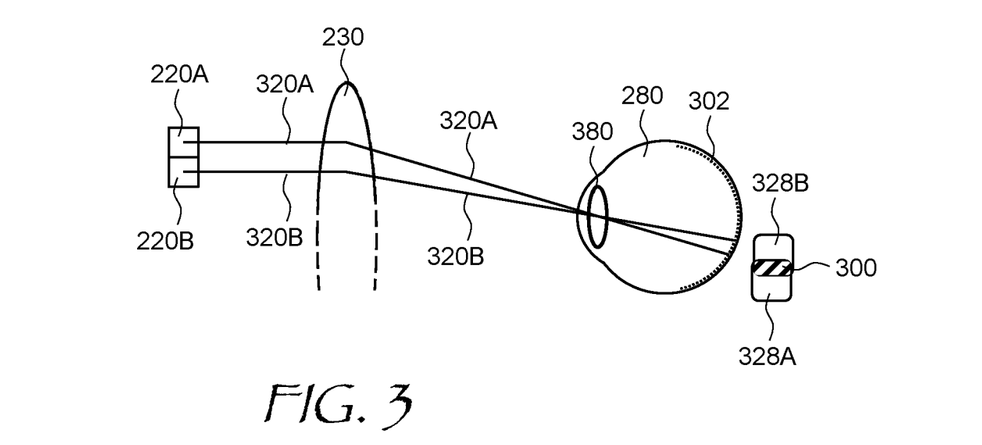
FIG. 3 is a zoom-in view of the display device of FIG. 2 showing optical interference between neighboring pixels on the eye's retina.

FIG. 3 illustrates origins of such a speckle pattern. FIG. 3 is a zoon-in of the display 200 of FIG. 2 with light paths 320A, 320B of neighboring sub-beam portions 122 propagated through neighboring display pixels 220A, 220B, redirected by the ocular lens 230, and focused by a lens/cornea 380 of the eye 280 onto a retina 302 of the eye 280. Due to the imperfect nature of the entire imaging train, including the ocular lens 230 and the eye lens/cornea 380, images 328A and 328B of the neighboring display pixels 220A and 220B may overlap on the retina 302 somewhat. An optical interference pattern 300 may appear in an overlap area between the images 328A and 328B of the neighboring display pixels 220A and 220B. The optical interference pattern 300 will also occur between other neighboring pixel images, not shown for clarity. The end result of the interference pattern formation 300 is that the entire visible image is highly speckled, creating a distracting, unnatural look of the observed imagery.

One approach to alleviate the optical interference pattern 300 is to provide a waveguide illuminator having a plurality of phase-uncorrelated light sources. Such light sources may be at slightly different emission wavelengths such that beams emitted by these sources when overlapped show no visible interference pattern. Referring for a non-limiting illustrative example to FIG. 4A, a waveguide illuminator 400A is similar to the waveguide illuminator 100 of FIG. 1, includes similar elements, may be implemented as a PIC, and may be used in the display device 200 of FIG. 2. Similarly to the waveguide illuminator 100, the waveguide illuminator 400A of FIG. 4A includes a substrate 401 supporting a first input waveguide 406 for guiding a first input light beam 408 provided by a first light source 410, e.g. a semiconductor light source such as a laser diode. A first waveguide splitter 412 is coupled to the first input waveguide 406. The function of the first waveguide splitter 412 is to split the first input light beam 408 into a first plurality of sub-beams 414. A first array of waveguides 416 is coupled to the first waveguide splitter 412 for propagating the sub-beams 414 in the waveguides 416 of the first array. The waveguides 416 run parallel to one another as illustrated. Each waveguide 416 is configured to guide one of the sub-beams 414. A first array of out-couplers 420, arranged in rows corresponding to individual waveguides 416, is supported by the substrate 401. Each row of the out-couplers 420 is coupled to one waveguide 416 of the first waveguide array along a length of the waveguide 416, for out-coupling portions 422 of one of the sub-beams 414 propagating in the waveguides 416. The portions 422 form a first two-dimensional array of out-coupled sub-beam portions.

The waveguide illuminator 400A further includes a second input waveguide 407 for guiding a second input light beam 409 provided by a second light source 411, e.g. a semiconductor light source such as a laser diode, at an opposite side of the substrate 401. A second waveguide splitter 413 is coupled to the second input waveguide 407 for splitting the second input light beam 409 into a second plurality of sub-beams 415. A second array of waveguides 417 is coupled to the second waveguide splitter 413 for propagating the sub-beams 415 in the waveguides 417. The waveguides 417 of the second waveguide array run parallel to one another and between the waveguides 416 of the first waveguide array, i.e. the waveguides 416 of the first waveguide array and the waveguides 416 of the first waveguide array are interleaved. The first 412 and second 413 waveguide splitters are disposed at opposite ends of the first and second waveguide arrays, i.e. to the left and right of the arrays in FIG. 4A.

Figure 4A:
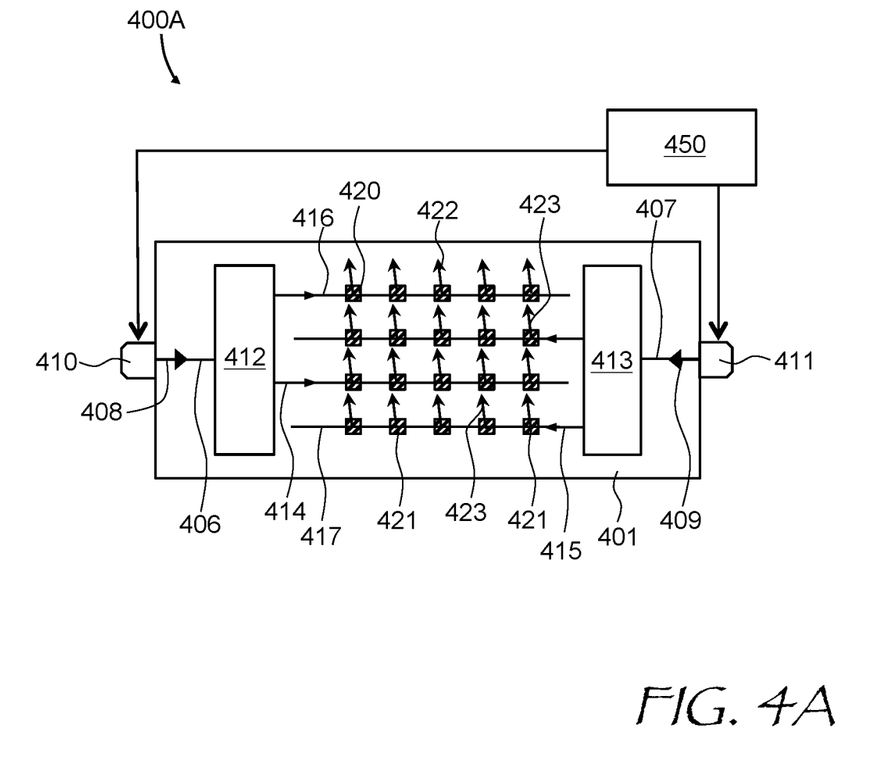
FIG. 4A is a schematic plan view of a waveguide illuminator embodiment using two light sources and interleaved waveguides.

Each waveguide 417 of the second waveguide array is configured to guide one sub-beam 415. A second array of out-couplers 421, arranged in rows, is supported by the substrate 401. Each row of out-couplers 421 is coupled to one of the waveguides 417 of the second waveguide array along the length of the waveguides 417, for out-coupling portions 423 forming a second two-dimensional array of out-coupled sub-beam portions. The first 408 and second 409 input light beams may be launched into the respective interleaved waveguide arrays from the two opposite sides of the waveguide illuminator 400A along the pairs of parallel waveguides 416, 417.

The two arrays of the out-coupled beam portions 422 and 423 are interleaved, which is a consequence of the waveguides 416 and 417 of the first and second waveguide arrays, and corresponding out-couplers 420 and 421 being interleaved as illustrated. The sub-beams 414 and 415 split from the first 408 and second 409 input light beams propagate in opposite directions, i.e. they counter-propagate. The first 410 and second 411 light sources may be configured to emit light at different wavelengths, e.g. wavelengths of a same color channel; for example, the first 410 and second 411 light sources may include laser diodes at different emission wavelengths, such that no steady optical interference pattern formation is possible. The interleaved configuration illustrated in FIG. 4 allows one to reduce or completely eliminate undesired optical interference effects between neighboring out-coupled beam portions 422 and 423, reducing or eliminating the deleterious effects of speckle pattern formation.

In some embodiments, the waveguide illuminator 400A of FIG. 4A may include a controller 450 coupled to the first 410 and second 411 light sources. The controller 450 may be configured to operate the first 410 and second 411 semiconductor light sources alternately in a time-sequential manner, to suppress interference between neighboring out-coupled beam portions 422 and 423. When the first 410 and second 411 light sources are operated in time-sequential manner, no interference occurs even when the emission spectra of the first 410 and second 411 light sources overlap fully or partially.

Figure 4B:
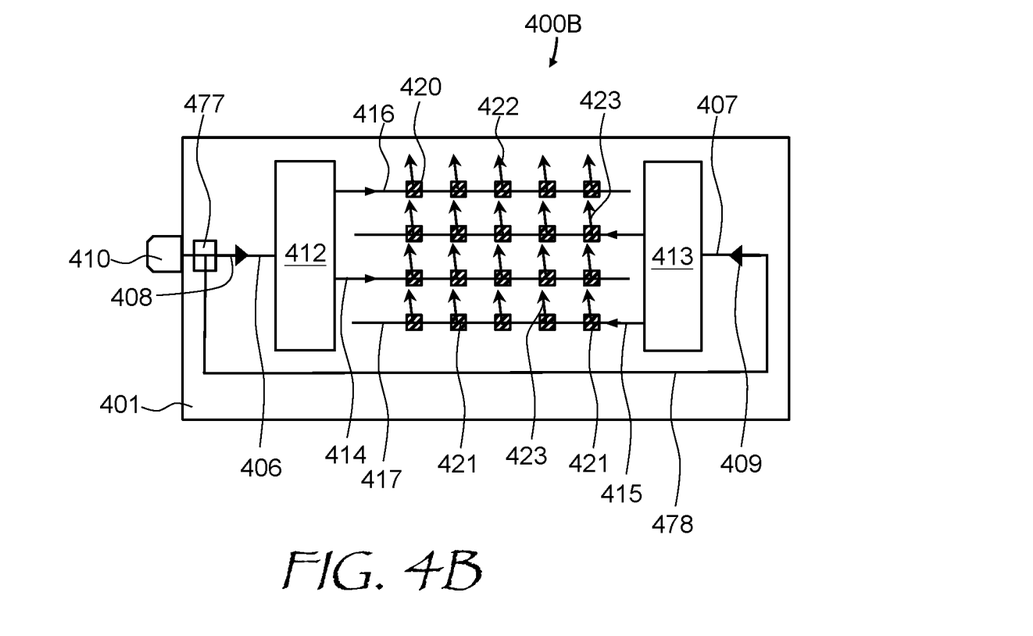
FIG. 4B is a schematic plan view of a waveguide illuminator embodiment using a light source, a splitter, and interleaved waveguides.

In some embodiments, the first 408 and second 409 input light beams can be emitted by a same laser source coupled to a light beam splitter, with sufficient path length between the first 408 and second 409 input light beams to destroy the phase coherence and suppress interference anywhere inside the output area. Referring for a non-limiting illustrative example to FIG. 4B, a waveguide illuminator 400B is similar to the waveguide illuminator 400A of FIG. 4A, includes similar elements, may be implemented in a PIC, and may be used in the display device 200 of FIG. 2. The waveguide illuminator 400B of FIG. 4B has a single light source, specifically the first light source 410, and a light source splitter 477, e.g. a 50/50 splitter, coupled to the first light source 410 for splitting light provided by the first light source 410 into the first 408 and second 409 input light beams and coupling the first 408 and second 409 input light beams to the first 412 and second 413 waveguide splitters respectively. An optical path length difference from the first light source 410 to the first 412 and second 413 waveguide splitters is greater than a coherence length of the first light source 410. In FIG. 4B, the path length difference is approximately equal to a length of an auxiliary waveguide 478 running from the light source splitter 477 to the second waveguide splitter 413.

Figure 5:
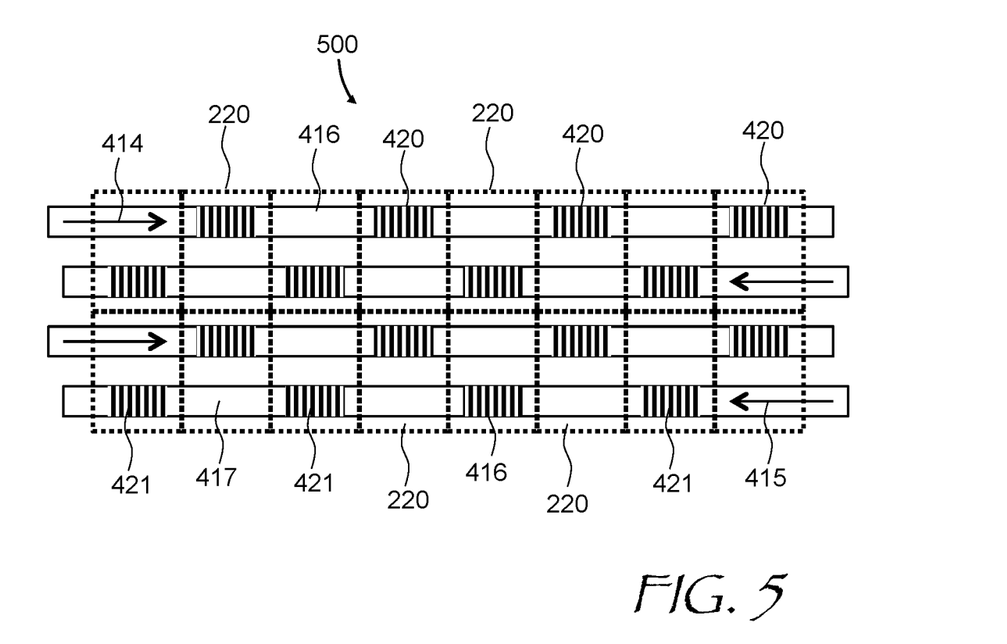
FIG. 5 is a magnified frontal view of an embodiment of the display device of FIG. 2 showing relative configuration of grating out-couplers and display panel pixels.

In a near-eye display, the optical interference and associated undesired speckle pattern formation result from neighboring sub-beam portions corresponding to neighboring pixels of a display panel illuminated with the waveguide illuminator overlapping on the retina of the user's eyes. As explained above with reference to FIG. 3, such sub-beam spot overlapping results from imperfections in the optical system that broadens images of the neighboring pixels on the retina. Consequently, increasing a distance between light spots from neighboring sub-beam portions of the illuminator may result in reduction of unwanted interference and suppression of the speckle pattern. Such a distance increase may be achieved by carefully selecting a spatial pattern of the illuminating light. Referring to FIG. 5 for a non-limiting illustrative example, an embodiment 500 of the display device 200 of FIG. 2 may use the waveguide illuminator 400A of FIG. 4A or the waveguide illuminator 400B of FIG. 4B. In FIG. 5, the pixels 220 of the display panel 202 form a rectangular array of pixels shown with thick dotted lines. The out-couplers 420 and 421 of neighboring rows of out-couplers are offset relative to one another in a direction of the waveguides 416, 417 i.e. horizontally in FIG. 5, to form a rhombic array of out-couplers 420, 421, each one of the pixels 220 of the rectangular pixel array still being illuminated with one of the out-couplers 420, 421 of the rhombic array of out-couplers. Such a configuration enables the out-couplers 420, 421 be spaced further away from one another, reducing the strength of optical interference between sub-beam portions out-coupled by neighboring out-couplers 420, 421 and, accordingly, suppressing the speckle pattern formation.

The optical interference between neighboring out-coupled sub-beam portions may also be suppressed or lessened by ensuring that the neighboring out-coupled sub-beam portions have orthogonal states of polarization. To that end, a spatially variant polarizer may be placed downstream of a display panel, e.g. the display panel 202 of the display device 200 of FIG. 2. For example, referring to FIG. 6 with further reference to FIG. 2, a spatially variant polarizer 600 (FIG. 6) may be placed instead of the linear polarizer/analyzer 228 (FIG. 2). In the embodiment shown in FIG. 6, the spatially variant polarizer 600 includes laterally joined linear polarizer segments 601, 602 having orthogonal orientations of polarization transmission axes. The spatially variant polarizer 600 is thus configured to propagate out-coupled sub-beam portions of a first polarization state and to block out-coupled neighboring sub-beam portions of a second, orthogonal polarization state. The transmitted neighboring sub-beam portions 122 will be orthogonally polarized and, accordingly, the optical interference between them will be suppressed.

Figure 6:
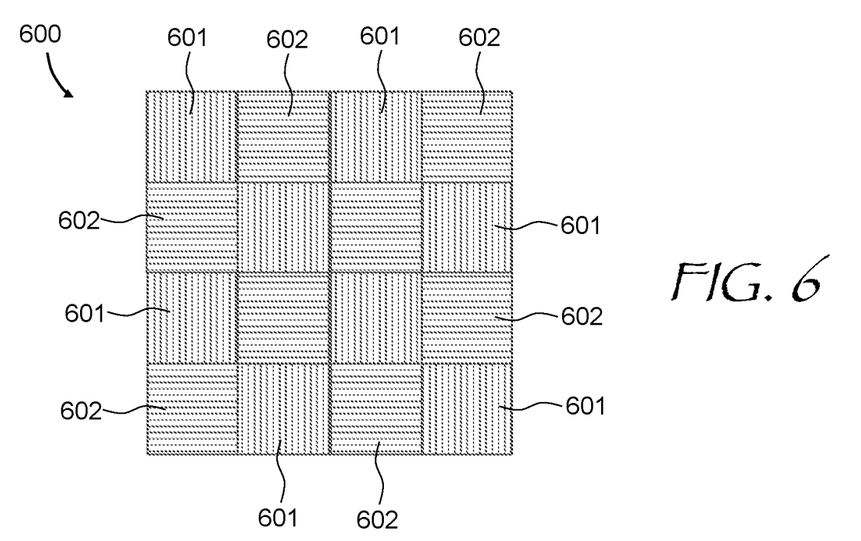
FIG. 6 is a plan view of a spatially variant polarizer for a waveguide illuminator of this disclosure, the spatially varying polarizer including a checkerboard pattern of orthogonally oriented linear polarizer segments.

The display panel 202 may be calibrated to act as a different waveplate depending on the corresponding polarizer orientation for each given pixel 220. Light transmitted through pixels 220 at different linear polarization will not undergo optical interference. The checkerboard pattern of transmission polarization orientations increases the distance between pixels 220 and sub-beam portions 122 of a same polarization state, reducing the likelihood of their overlap at the retina of the user's eye as explained above with reference to FIG. 3.

Figure 7A:
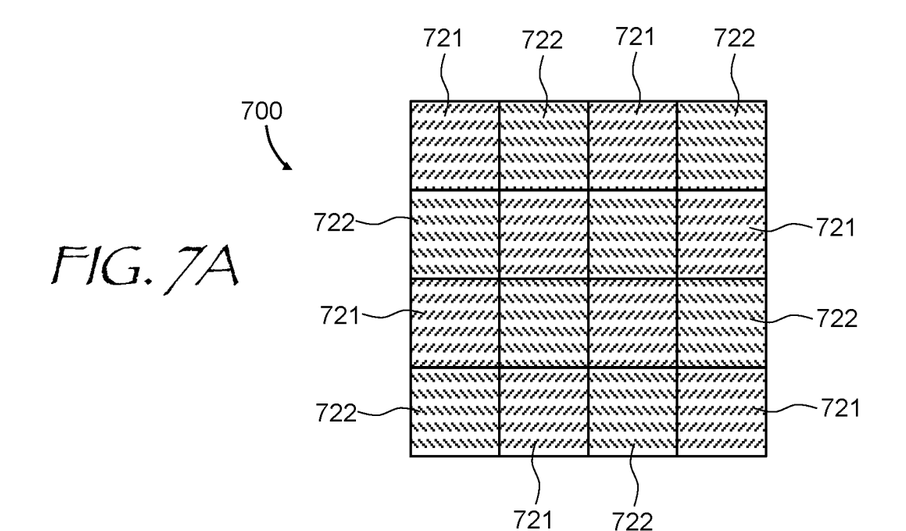
FIGS. 7A and 7B are plan and side views, respectively, of a spatially variant polarizer embodiment for a waveguide illuminator of this disclosure, including a linear polarizer followed by a checkerboard pattern of waveplates.
Figure 7B:
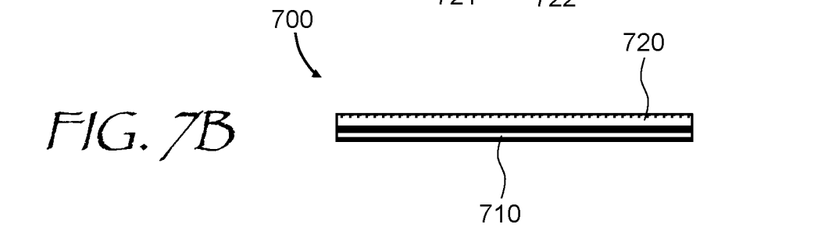
Figure 8:
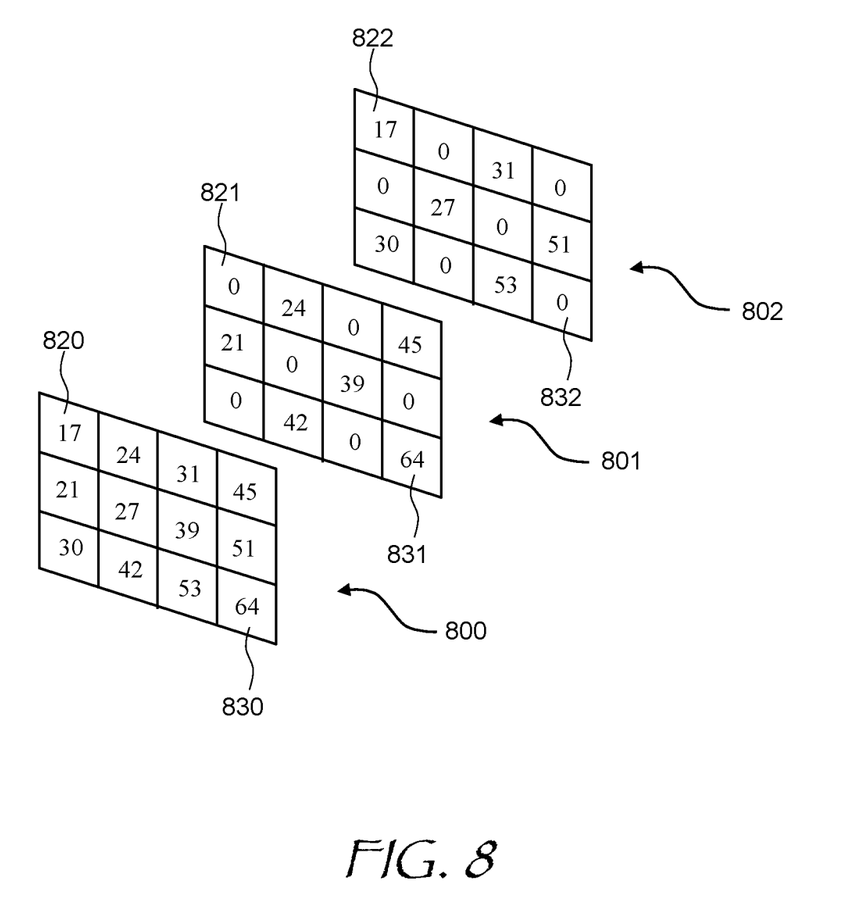
FIG. 8 is a three-dimensional diagram illustrating the principle of interleaved sub-images for interference reduction.

Referring now to FIGS. 7A and 7B with further reference to FIG. 2, a spatially variant polarizer 700 may be placed instead of the linear polarizer/analyzer 228. In the embodiment shown, the spatially variant polarizer 700 includes a uniform linear polarizer 710 and a spatially variant waveplate 720 downstream of the uniform linear polarizer 710. The spatially variant waveplate 720 includes laterally joined waveplate segments 721, 722 of different direction of optic axis. For half-wave waveplates, the directions may differ by 45 degrees. The waveplate segments 721, 722 of same directions of optic axis may be arranged in complementary checkerboard patterns as shown.

In some embodiments of this disclosure, optical interference/speckle effects in a display device caused by coherent illumination may be mitigated by controlling individual pixels of the display to only provide non-zero optical power density for non-neighboring pixels, with all pixels being eventually energized in a time-sequential manner. To that end, the controller 250 of the display device 200 of FIG. 2 may be configured to cause the display panel 202 to display a plurality of sub-images in a time-sequential manner, the sub-images adding up to an image to be displayed to a user.

Turning to FIG. 8 for a non-limiting illustrative example, an image 800 to be displayed to a user includes a two-dimensional array of brightness values represented by numbers placed in individual pixels. First 801 and second 802 sub-images add up to the image 800. In other words, corresponding pixel values of the first and second sub-images 801 and 802 add up to the pixel values of the image 800. For example, a pixel 820 of the image 800 has a value of 17. This value is represented by a sum of a pixel 821 of the first sub-image 801, having a zero value, and a pixel 822 of the second sub-image 802 having the value of 17. Similarly, a pixel 830 of the image 800 has a value of 64. This value is represented by a sum of a pixel 831 of the first sub-image 801, having a value of 64, and a pixel 832 of the second sub-image 802 having a zero value.

The sub-images 801 and 802 may be displayed by the controller 250 in a time-sequential manner, i.e. quickly one after another such that the user's eye integrates them into a single image. Pixels of different sub-images of the plurality of sub-images may be interleaved, e.g. the pixels of different sub-images with non-zero brightness values may be disposed in complementary checkerboard patterns, as illustrated in FIG. 8. The interleaving of non-zero pixel values ensures that no light from neighboring pixels can interfere on the user's eye retina. The net result will be the suppression of visible speckle/interference patterns.

More than two sub-images may be provided, with the same principle that the pixel brightness values add up to the desired images. Depending on the total number of sub-images and a boundary or in-frame location of a pixel of the first sub-image, the pixel may have at least one neighboring pixel of the second image, at least two neighboring pixels of the second sub-image, or at least three or four neighboring pixels. For definiteness, it is noted that neighboring pixels are defined herein as sharing at least one side border.

It is further noted that optical interference/speckle mitigation configurations and methods disclosed herein are not mutually exclusive, and may be used in a complementary manner. For example, the counter-propagation of sub-beams in interleaved waveguides illustrated in FIGS. 4A and 4B may be complemented by time-sequential energizing of corresponding light sources, providing output interlaced polarization by means of the analyzer presented in FIGS. 7A and 7B, and/or providing sub-images in time-sequential manner. The time-sequential light source energizing may be complemented by time-sequential sub-image display illustrated in FIG. 8, or by other methods disclosed herein. The time-sequential sub-image display may be complemented by checkerboard output polarization, and so forth.

Figure 9:
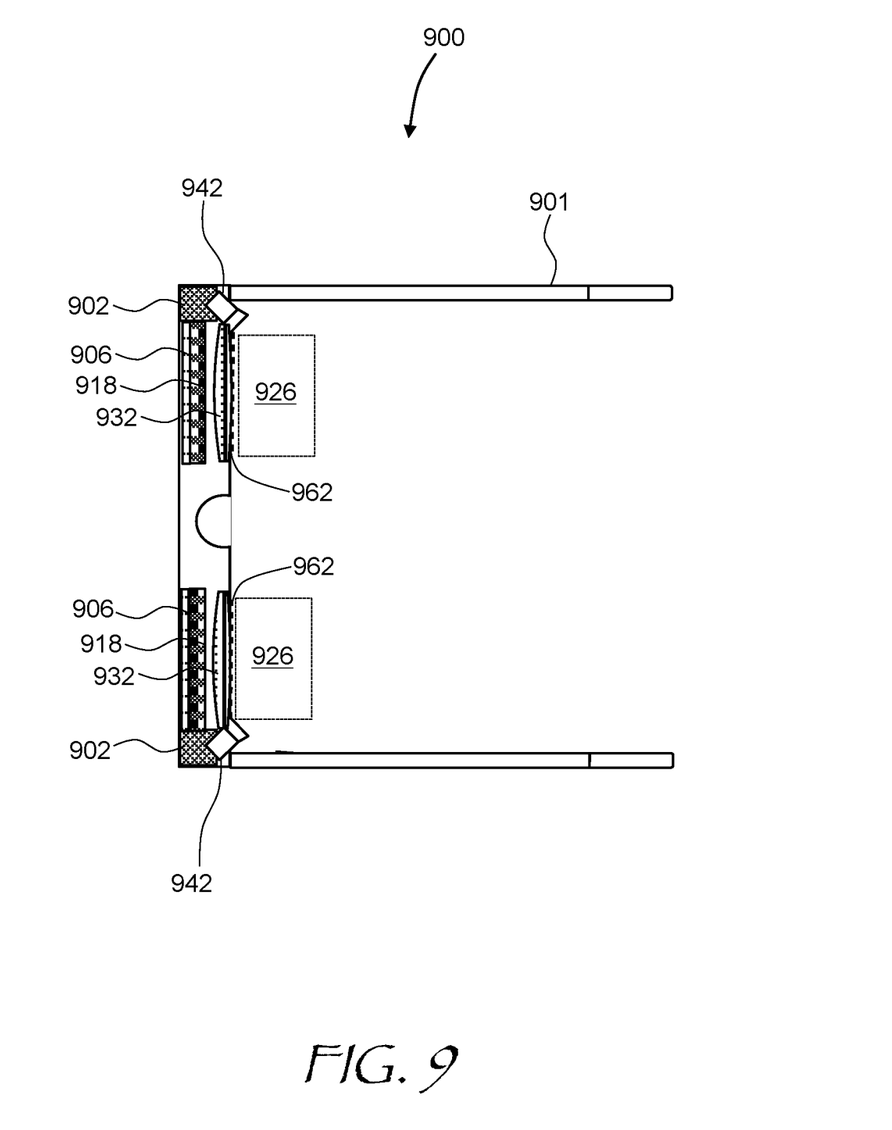
FIG. 9 is a view of an augmented reality (AR) display of this disclosure having a form factor of a pair of eyeglasses.

Turning to FIG. 9, a virtual reality (VR) near-eye display 900 includes a frame 901 supporting, for each eye: a light source 902; a waveguide illuminator 906 operably coupled to the light source 902, the waveguide illuminator 906 including any of the waveguide illuminators disclosed herein; a display panel 918 including an array of display pixels, where positions of the out-coupling gratings in the waveguide illuminator 906 are coordinated with positions of the polarization-tuning pixels of the display panel 918; and an ocular lens 932 for converting the image in linear domain generated by the display panel 918 into an image in angular domain for direct observation at an eyebox 926. A plurality of eyebox illuminators 962, shown as black dots, may be placed onto the side of the waveguide illuminator 906 that faces the eyebox 926. An eye-tracking camera 942 may be provided for each eyebox 926.

The purpose of the eye-tracking cameras 942 is to determine position and/or orientation of both eyes of the user. The eyebox illuminators 962 illuminate the eyes at the corresponding eyeboxes 926, allowing the eye-tracking cameras 942 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 962, the latter may be made to emit light invisible to the user. For example, infrared light may be used to illuminate the eyeboxes 926.

Figure 10:
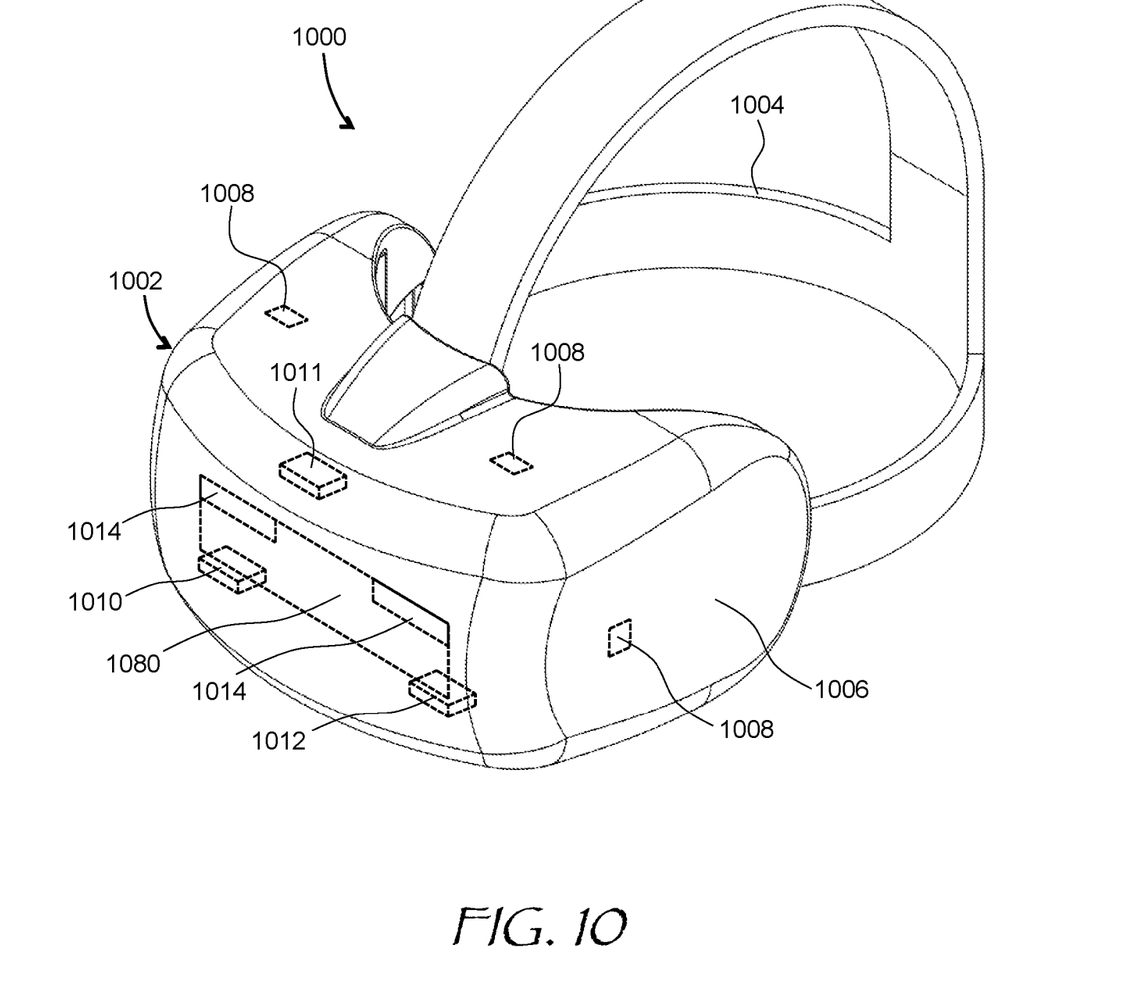
FIG. 10 is a three-dimensional view of a head-mounted display (HMD) of this disclosure.

Turning to FIG. 10, an HMD 1000 is an example of an AR/VR wearable display system which encloses the user's face, for a greater degree of immersion into the AR/VR environment. The HMD 1000 may generate the entirely virtual 3D imagery. The HMD 1000 may include a front body 1002 and a band 1004 that can be secured around the user's head. The front body 1002 is configured for placement in front of eyes of a user in a reliable and comfortable manner. A display system 1080 may be disposed in the front body 1002 for presenting AR/VR imagery to the user. The display system 1080 may include any of the display devices and illuminators disclosed herein. Sides 1006 of the front body 1002 may be opaque or transparent.

In some embodiments, the front body 1002 includes locators 1008 and an inertial measurement unit (IMU) 1010 for tracking acceleration of the HMD 1000, and position sensors 1012 for tracking position of the HMD 1000. The IMU 1010 is an electronic device that generates data indicating a position of the HMD 1000 based on measurement signals received from one or more of position sensors 1012, which generate one or more measurement signals in response to motion of the HMD 1000. Examples of position sensors 1012 include: one or more accelerometers, one or more gyroscopes, one or more magnetometers, another suitable type of sensor that detects motion, a type of sensor used for error correction of the IMU 1010, or some combination thereof. The position sensors 1012 may be located external to the IMU 1010, internal to the IMU 1010, or some combination thereof.

The locators 1008 are traced by an external imaging device of a virtual reality system, such that the virtual reality system can track the location and orientation of the entire HMD 1000. Information generated by the IMU 1010 and the position sensors 1012 may be compared with the position and orientation obtained by tracking the locators 1008, for improved tracking accuracy of position and orientation of the HMD 1000. Accurate position and orientation is important for presenting appropriate virtual scenery to the user as the latter moves and turns in 3D space.

The HMD 1000 may further include a depth camera assembly (DCA) 1011, which captures data describing depth information of a local area surrounding some or all of the HMD 1000. The depth information may be compared with the information from the IMU 1010, for better accuracy of determination of position and orientation of the HMD 1000 in 3D space.

The HMD 1000 may further include an eye tracking system 1014 for determining orientation and position of user's eyes in real time. The obtained position and orientation of the eyes also allows the HMD 1000 to determine the gaze direction of the user and to adjust the image generated by the display system 1080 accordingly. The determined gaze direction and vergence angle may be used to adjust the display system 1080 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1002.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A waveguide illuminator comprising:
   first and second waveguide splitters configured to receive first and second light beams, respectively, for splitting the first and second light beams into first and second pluralities of sub-beams, respectively;
   first and second waveguide arrays coupled to the first and second waveguide splitters, respectively, and configured to propagate the sub-beams of the first and second pluralities of sub-beams, respectively, wherein waveguides of the first and second waveguide arrays are interleaved and run parallel to each other; and
   an array of rows of out-couplers, each row of out-couplers of the array being coupled to a waveguide of the first or second waveguide array along a length of the waveguide for forming a two-dimensional array of interleaved out-coupled sub-beam portions of the first and second pluralities of sub-beams;
   wherein out-couplers of neighboring rows of out-couplers are offset relative to one another in a direction along the waveguides of the first and second waveguide arrays, to form a rhombic array of out-couplers.

2. A waveguide illuminator comprising:
   first and second waveguide splitters configured to receive first and second light beams, respectively, for splitting the first and second light beams into first and second pluralities of sub-beams, respectively;
   first and second waveguide arrays coupled to the first and second waveguide splitters, respectively, at opposed ends of the first and second waveguide arrays, and configured to counter-propagate the sub-beams of the first and second pluralities of sub-beams, respectively, wherein waveguides of the first and second waveguide arrays are interleaved and run parallel to each other; and
   an array of rows of out-couplers, each row of out-couplers of the array being coupled to a waveguide of the first or second waveguide array along a length of the waveguide for forming a two-dimensional array of interleaved out-coupled sub-beam portions of the first and second pluralities of sub-beams.

3. The waveguide illuminator of claim 2, further comprising first and second semiconductor light sources coupled to the first and second waveguide splitters, respectively, for providing the first and second light beams thereto.

4. The waveguide illuminator of claim 3, wherein the first and second semiconductor light sources are configured to emit light at different wavelengths of a same color channel.

5. The waveguide illuminator of claim 3, wherein the first and second semiconductor light sources comprise laser diodes at different emission wavelengths.

6. The waveguide illuminator of claim 3, further comprising a controller coupled to the first and second semiconductor light sources and configured to operate the first and second semiconductor light sources alternately in a time-sequential manner.

7. A display device comprising:
- a display panel comprising a two-dimensional pixel array; and
- a waveguide illuminator configured to illuminate the display panel and comprising:
  - a waveguide splitter configured to receive and split a light beam into a plurality of sub-beams;
  - a waveguide array coupled to the waveguide splitter and configured to propagate the sub-beams therein, waveguides of the waveguide array running parallel to each other; and
  - an array of rows of out-couplers, each row of out-couplers of the array being coupled to a waveguide of the waveguide array along a length of the waveguide for forming a two-dimensional array of out-coupled sub-beam portions corresponding to the two-dimensional pixel array of the display panel.

8. The display device of claim 7, further comprising a controller operably coupled to the display panel and configured to cause the display panel to display a plurality of sub-images in a time-sequential manner, the sub-images adding up to an image to be displayed to a user.

9. The display device of claim 8, wherein pixels of different sub-images of the plurality of sub-images are interleaved.

10. The display device of claim 9, wherein pixels of different sub-images of the plurality of sub-images are disposed in complementary checkerboard patterns.

11. The display device of claim 9, wherein the plurality of sub-images comprises first and second sub-images having interleaved pixels, such that each pixel of the sub-image has at least two neighboring pixels of the second sub-image.

12. The display device of claim 11, wherein each pixel of the first sub-image has at least three neighboring pixels of the second sub-image.

13. The display device of claim 8, wherein the display panel comprises an array of transmissive light valves.

14. The display device of claim 13, wherein the display panel comprises a liquid crystal layer.

* * * * *